Figure 1:
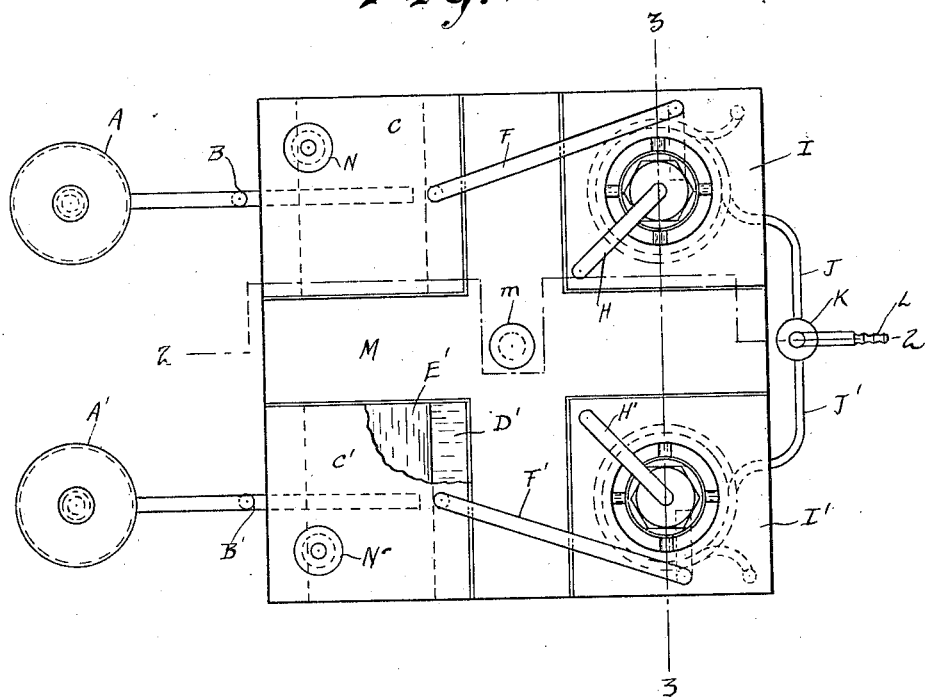

H. MÜLLER.
APPARATUS FOR TREATING WELDING GASES.
APPLICATION FILED NOV. 26, 1909.

1,109,777.

Patented Sept. 8, 1914.
2 SHEETS—SHEET 1.

H. MÜLLER.
APPARATUS FOR TREATING WELDING GASES.
APPLICATION FILED NOV. 26, 1909.
1,109,777.
Patented Sept. 8, 1914.
2 SHEETS—SHEET 2.
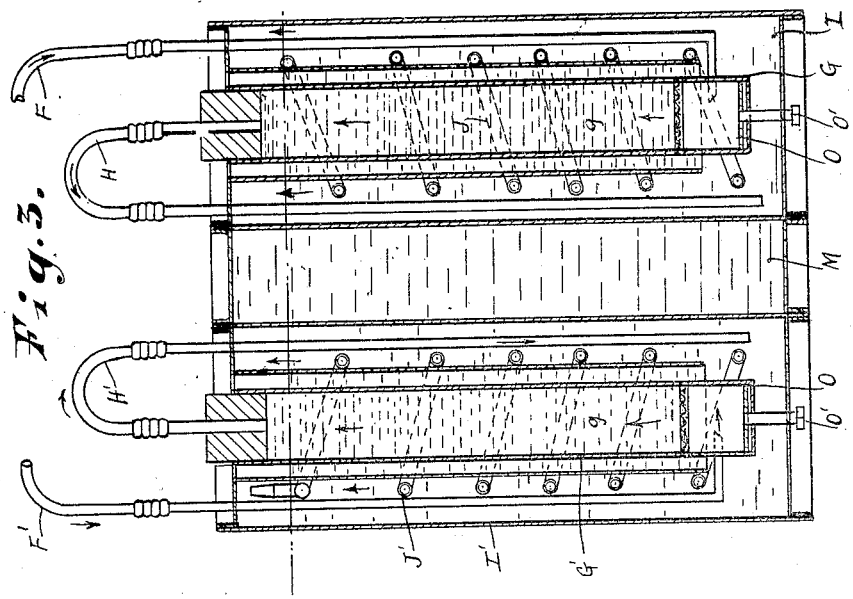
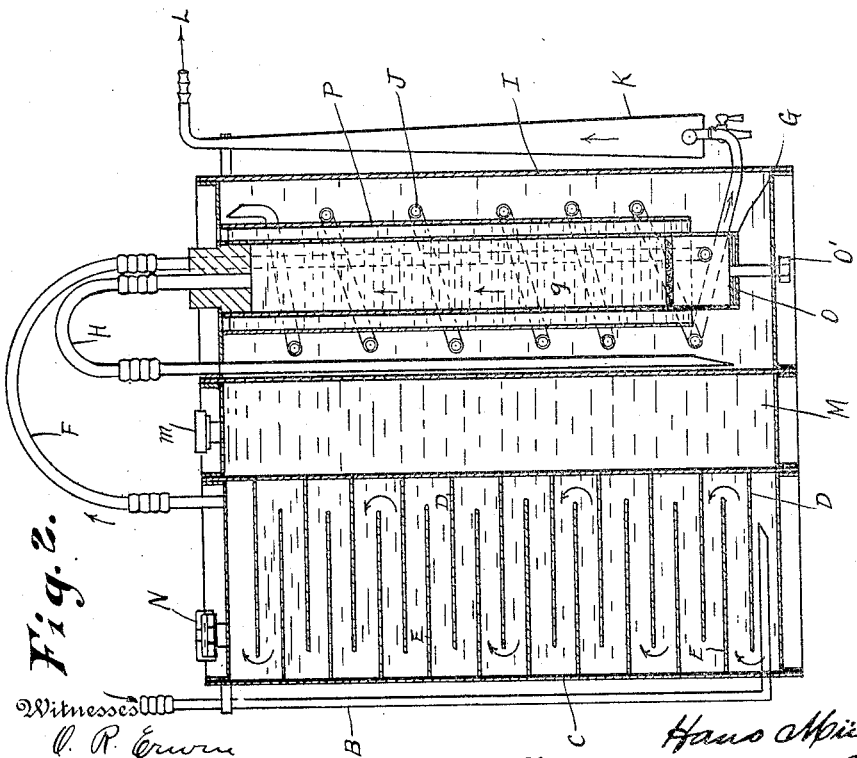

UNITED STATES PATENT OFFICE.

HANS MÜLLER, OF MILWAUKEE, WISCONSIN, ASSIGNOR TO UNIVERSAL OXYGEN COMPANY, A CORPORATION OF WISCONSIN.

APPARATUS FOR TREATING WELDING-GASES.

1,109,777.  Specification of Letters Patent.  Patented Sept. 8, 1914.

Application filed November 26, 1909. Serial No. 529,934.

*To all whom it may concern:*

Be it known that I, HANS MÜLLER, a subject of the Emperor of Germany, residing at Milwaukee, county of Milwaukee, and State of Wisconsin, have invented new and useful Improvements in Apparatus for Treating Welding-Gases, of which the following is a specification.

My invention relates to improvements in apparatus for treating welding gases.

The object of my invention is to provide means for separately charging gases burning at high temperatures, such as oxygen and hydrogen, with a vapor having, under ordinary conditions, a lower burning temperature, under conditions which avoid the possibility of explosions within the apparatus; the gases thus separately charged, being subsequently mixed preparatory to their delivery to the burner. The mixture thus produced, burns at a temperature exceeding that of pure mixtures of hydrogen and oxygen and can be so proportioned as to secure a proper welding temperature without difficulty. The mixture is also much less expensive, owing to the introduction of a large quantity of inexpensive gas or vapor.

In the following description, reference is had to the accompanying drawings, in which—

Figure 1 is a plan view of my improved apparatus. Fig. 2 is a sectional view of the same drawn on line 2—2 of Fig. 1, and Fig. 3 is a sectional view, drawn on line 3—3 of Fig. 1.

Like parts are identified by the same reference characters throughout the several views.

In my improved apparatus, I first deliver gases burning at high temperatures, such as oxygen and hydrogen, through separate bodies of a liquid hydrocarbon, such as gasolene, benzin, or a liquid combination or a combination of acetylene such as acetylene and acetone; after which, the resultant fluids thus separately charged with hydrocarbon, are separately filtered and then separately washed in a cleansing liquid, preferably water, the latter serving also to prevent fire from the burner from flashing back to the charging chambers. After being thus filtered and cleansed, the fluids are mixed in a comparatively small chamber and delivered therefrom directly to the burner. By separately passing oxygen and hydrogen through liquid hydrocarbon and separately filtering and cleansing the resultant mixtures before uniting them, a large quantity of hydrocarbon is absorbed by the gases, and a higher temperature secured at the burner; the temperature of burning hydrogen being 2500° C., while the burning temperature of the mixture produced by my improved process is approximately 3000° C., this temperature having been determined by a silica test.

In the construction of my apparatus, I provide flasks or storage tanks A and A', adapted to contain oxygen and hydrogen respectively. The oxygen is delivered through a pipe B into the lower portion of a tank C, which is filled with liquid hydrocarbon, preferably gasolene or benzin. The gas discharged through the pipe B passes upwardly in tank C around the deflecting plates D and E, which extend inwardly from opposite sides of the tank C and form horizontal partial partitions, the oxygen being thus forced to pass back and forth through the gasolene, in order to reach the upper portion of this tank C, so that before escaping from the gasolene, it will be saturated with hydrocarbon vapor. The mixture of oxygen and hydrocarbon vapor is then delivered through a pipe F to the bottom of a filtering chamber G and passes upwardly through the filtering material *g* to the upper portion of this chamber. It is then again delivered downwardly through a pipe H to the bottom of a water tank I and in passing upwardly through the water, the gas is not only cleansed but cooled, after which it is again delivered downwardly from the upper portion of the chamber I, through a coiled pipe J, which pipe, at its lower end, leads outwardly through the walls of the chamber I and is connected to the lower portion of the mixing chamber K, where it is united with the similarly charged hydrogen gas entering the mixing chamber through a pipe J'. The fluid produced by this mixture is delivered directly to the burner L.

The hydrogen gas from the tank A' is treated in the same manner as that above described for the treatment of oxygen, the hydrogen being delivered through pipe B' to the lower portion of tank C' and upwardly through liquid hydro-carbon in said tank, and around deflecting plates D' and E', and thence through pipe F' filtering chamber G′, pipe H′, water tank I′, and coiled pipe J′ to the mixing chamber K.

A partition chamber M, filled with water, is preferably interposed between the tanks C and C′, and extends between the washing chambers I and I′. It also extends between these washing chambers and the chambers C and C′. This chamber M may be filled through a capped opening at m. The chambers C and C′ may be filled through capped openings N, these caps being preferably unconnected or in mere slip joint connection, and held in position by gravity. They, therefore, serve also as safety valves and open under light pressures. The filtering material g may consist of any suitable material, such, for example, as alternate layers of fibrous material and of charcoal. These filtering chambers may be provided with compartment bottoms O into which water, sediment, condensed residue of hydrocarbon vapor, or any other impurities may drip and be drained off through ducts O′. Each of the filtering chambers is preferably provided with an outer wall P between which and the filtering chamber proper, the water enters. These spaces are preferably open at the top so that any back pressure on the water in the tanks I or I′, due to explosions or flash backs, will be relieved by blowing part of the water out through the spaces, whereby the apparatus is effectually protected against fire from the burner in case the same should flash back to the surface of the water in chamber I or I′. Instead of water, any compact, porous mass might be used which would produce the same effect. The pipe J, however, is of such length in the coiled portion as to ordinarily prevent flashes of flame from reaching the chambers I or I′.

With the above described apparatus designed to provide for safely treating two or more high temperature burning gases with hydro-carbon, I not only secure a fluid adapted for autogenous welding at a comparatively small cost, but I also secure a burner temperature which is better adapted for the purpose than either pure hydrogen or simple combinations of acetylene with oxygen. In oxyhydrogen welding, without hydrocarbon, the temperature of the welding flame, about 2500° C., is lower than it should be for highest efficiency. On the other hand, a simple combination of acetylene and oxygen produces a welding flame of about 3500° C. and with this flame, there is danger of over-heating, and the metal is usually rendered brittle, except where thick, heavy pieces are to be united. By my improved method, however, the intermediate temperature of about 3000° C. is secured. This temperature (3000° C.) is not only approximately correct, but it may be varied somewhat to correspond with the character of the work, by varying the proportion of hydro-carbon. Practical tests, however, have demonstrated that with a temperature of 3000° C. very good results may be obtained for welding either thick or thin pieces of metal. The flame is short, contains no unnecessary gas, causes no unnecessary expansion of the metal, and so adds to the element of economy. The proportion of carbon incorporated with the other gases may be varied by substituting benzin or acetylene dissolved in acetone or other compounds of carbon for the gasolene in chambers C and C′. Thus, the chemical formula of $H_2O$ for the simple hydrogen-oxygen flame theoretically is changed to $H_2OC_3$, where gasolene is used to saturate the hydrogen and oxygen, and 18 atoms of the hydrogen represented in this formula are supplied from the gasolene. With benzol as the charging agent, the formula $H_7OC_6$ indicates the burner gas, and five atoms of hydrogen are derived from the benzol. With acetylene as the charging agent, the formula will be $H_4OC_2$. In practice, however, these theoretical results are not fully realized, the proportion of carbon being even greater than indicated by the formula, as demonstrated by weight tests. The tests which I have made, however, indicate that the above stated formulas are approximately correct.

While I have described my invention as involving the use of hydrogen as the combustible gas, and of oxygen as the agent of combustion, I do not limit the scope of my invention to these specific gases, since any gases maintaining welding temperatures during combustion may be employed and charged with liquid hydro-carbon as above described, with reference to the use of hydrogen and oxygen. It is also not absolutely essential that both the combustible gas and the agent of combustion be charged with hydro-carbon vapor, since partial results may be secured by charging only one of these gases with such vapor, although this is not productive of the same economy. By separately charging the gases under conditions calculated to insure safety in so doing, and then mixing them preparatory to ignition, a much larger percentage of carbon may be incorporated, thus giving a higher heating value and greater economy in the use of the more expensive gases.

The above described apparatus is also of decided advantage when used in connection with the electrolytic production of hydrogen and oxygen gases in that it tends to equalize the consumption of the two gases and their electrolytic production. Electrolysis produces hydrogen and oxygen gases in the proportion of 2:1, a proportion which is disadvantageous in welding, since for satisfactory welding, the proportion of hydrogen to oxygen is 5:1. This difficulty has been overcome in my improved apparatus. It has been experimentally proven, that, two cubic feet of electrolytic hydrogen and one cubic foot of electrolytic oxygen will absorb three cubic feet of hydro-carbon gas, thus permitting the economical use of all the gas produced by the electrolysis of water. Furthermore, this process can be used wherever the melting of metals with burning gases is carried out. By the use of the above described apparatus, the gases in present use can be enriched and made to produce a higher temperature, thus facilitating the melting, and making the entire process decidedly more economical.

Having thus described my invention, what I claim as new, and desire to secure by Letters Patent, is—

1. In apparatus of the described class, the combination of a set of receptacles for separately storing a high temperature burning gas and a combustion supporting gas, a carbureting chamber connected with each such receptacle to receive fluid therefrom, a water tank in cooling relation to the carbureting chambers and separating said chambers from each other, and a mixing chamber connected with both carbureting chambers and provided with a burner outlet.

2. In apparatus of the described class, the combination of a set of receptacles for separately storing a high temperature burning gas and a combustion supporting gas, a carbureting chamber connected with each such receptacle to receive fluid therefrom, and a mixing chamber connected with both carbureting chambers and provided with a burner outlet, together with a set of auxiliary filtering and flame resisting chambers interposed in the path of the gases between each of the carbureting chambers and the mixing chamber.

3. In apparatus of the described class, the combination of a set of receptacles for separately storing a high temperature burning gas and a combustion supporting gas, a carbureting chamber connected with each such receptacle, to receive fluid therefrom, and a mixing chamber connected with both carbureting chambers and provided with a burner outlet, together with a filter, and a water chamber concentric therewith and interposed between each of the carbureting chambers and the mixing chamber, the arrangement being such that the gas passes upwardly through the water in the water chamber.

4. In a device of the described class, the combination of a set of storage receptacles, a set of carbureting chambers, one for each storage receptacle, a filter, an auxiliary filtering and flame resisting chamber for each carbureter concentric with said filter, and means for discharging gas from each carbureter through such filter and auxiliary chambers, an open vent chamber in communication with the bottom portion of the auxiliary chamber, and a mixing chamber arranged to receive the gases from the several chambers.

5. In a device of the described class, the combination of a mixing chamber provided with a burner nozzle, a set of storage receptacles, a set of carbureting chambers, one for each storage receptacle, a filter arranged for upward gas delivery, an auxiliary filtering and flame resisting chamber for each carbureter, means for delivering gas from the upper portion of the filter to the lower portion of the auxiliary chamber, a coiled pipe communicating from the upper portion of each auxiliary chamber downwardly therethrough to the mixing chamber and adapted to conduct gas from the respective carbureter filter and auxiliary chambers to the mixing chamber, said carbureters, filters and chambers being separated from each other by a body of noncombustible liquid.

In testimony whereof I affix my signature in the presence of two witnesses.

HANS MÜLLER.

Witnesses:
 EUGENE G. LUENING,
 LEVERETT C. WHEELER.